United States Patent
Osepowicz et al.

(10) Patent No.: US 10,003,090 B2
(45) Date of Patent: Jun. 19, 2018

(54) FUEL CELL COMPONENT HAVING A FLAP EXTENDING FROM A POLYMER IMPREGNATED REGION

(71) Applicant: Doosan Fuel Cell America, Inc., Atlanta, GA (US)

(72) Inventors: Nicholas Edward Osepowicz, Broad Brook, CT (US); Manish Khandelwal, South Windsor, CT (US); Sridhar V. Kanuri, Milford, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 415 days.

(21) Appl. No.: 14/766,995

(22) PCT Filed: Feb. 19, 2013

(86) PCT No.: PCT/US2013/026674
§ 371 (c)(1),
(2) Date: Aug. 11, 2015

(87) PCT Pub. No.: WO2014/130010
PCT Pub. Date: Aug. 28, 2014

(65) Prior Publication Data
US 2015/0372323 A1    Dec. 24, 2015

(51) Int. Cl.
*H01M 8/0271*    (2016.01)
*H01M 8/086*    (2016.01)
(Continued)

(52) U.S. Cl.
CPC ....... *H01M 8/0271* (2013.01); *H01M 8/0273* (2013.01); *H01M 8/0276* (2013.01);
(Continued)

(58) Field of Classification Search
CPC ............ H01M 8/0271; H01M 8/0273; H01M 8/0276; H01M 8/028; H01M 8/0284; H01M 8/0286; H01M 8/086
See application file for complete search history.

(56) References Cited

U.S. PATENT DOCUMENTS 5,156,929 A    10/1992    Dec et al.
5,178,968 A     1/1993    Roche
(Continued)

FOREIGN PATENT DOCUMENTS

JP    60000064    5/1985

OTHER PUBLICATIONS

Extended European Search Report for Application No. EP 13 876 049.1 dated Aug. 3, 2016.
(Continued)

*Primary Examiner* — Alix Eggerding
(74) *Attorney, Agent, or Firm* — Carlson, Gaskey & Olds

(57) ABSTRACT

According to an example embodiment, a method of making a fuel cell component includes permeating at least a portion of a component layer with a polymer. The portion of the component layer is adjacent an edge of the component layer. Some of the polymer is allowed to extend beyond the edge to thereby establish a flap beyond the edge of the component layer. A fuel cell component includes a component layer having a portion adjacent an edge of the layer that is impregnated with a polymer material and a flap of the polymer material extending beyond the edge.

18 Claims, 2 Drawing Sheets

(51) Int. Cl.
*H01M 8/0273* (2016.01)
*H01M 8/0284* (2016.01)
*H01M 8/0286* (2016.01)
*H01M 8/0276* (2016.01)
*H01M 8/0234* (2016.01)

(52) U.S. Cl.
CPC ....... *H01M 8/0284* (2013.01); *H01M 8/0286* (2013.01); *H01M 8/086* (2013.01); *H01M 8/0234* (2013.01); *H01M 2300/0008* (2013.01); *Y02P 70/56* (2015.11)

(56) References Cited

U.S. PATENT DOCUMENTS

| | | |
|---|---|---|
| 8,197,990 B2 | 6/2012 | Burdzy et al. |
| 2002/0187384 A1 | 12/2002 | Kato et al. |
| 2004/0112532 A1 | 6/2004 | Yandrasits et al. |
| 2005/0100776 A1* | 5/2005 | Brunk ................. C25B 9/10 |
| | | 429/481 |
| 2007/0190400 A1* | 8/2007 | Buche ................. H01M 4/8605 |
| | | 429/483 |
| 2011/0311897 A1 | 12/2011 | Kato |
| 2012/0028160 A1 | 2/2012 | Kanuri et al. |
| 2012/0028172 A1 | 2/2012 | Kanuri et al. |
| 2012/0052403 A1* | 3/2012 | Tatematsu ........... H01M 8/1027 |
| | | 429/408 |
| 2013/0040228 A1 | 2/2013 | Beuche et al. |

OTHER PUBLICATIONS

International Preliminary Report on Patentability for International application No. PCT/US2013/026674 dated Aug. 11, 2015.

International Search Report and Written Opinion of the International Searching Authority for International application No. PCT/US2013/026674 dated Oct. 24, 2013.

Extended European Search Report for Application No. EP 13 87 5567 dated Sep. 5, 2016.

* cited by examiner

FUEL CELL COMPONENT HAVING A FLAP EXTENDING FROM A POLYMER IMPREGNATED REGION

BACKGROUND

Fuel cells are useful for generating electricity based on an electrochemical reaction. Several components of the fuel cell are designed to facilitate the electrochemical reaction. One of the challenges associated with operating a fuel cell is maintaining an adequate seal at various locations within the cell stack assembly. For example, it is desirable to maintain the reactants in the chemically active portion of the fuel cell to realize the electrochemical reaction. In the case of a phosphoric acid fuel cell, it also is desirable to maintain the phosphoric acid in appropriate locations within the cell stack assembly. Various proposals have been made to address such concerns, however, some of them may not provide adequate sealing performance while others introduce undesired additional expense into the cost of a fuel cell system.

SUMMARY

According to an example embodiment, a method of making a fuel cell component includes permeating at least a portion of a component layer with a polymer. The portion of the component layer is adjacent an edge of the component layer. Some of the polymer is allowed to extend beyond the edge to thereby establish a flap beyond the edge of the component layer.

A fuel cell component includes a component layer having a portion adjacent an edge of the layer that is impregnated with a polymer material and a flap of the polymer material extending beyond the edge.

The various features and advantages of at least one disclosed example embodiment will become apparent to those skilled in the art from the following detailed description. The drawings that accompany the detailed description can be briefly described as follows.

DETAILED DESCRIPTION

Figure 1:
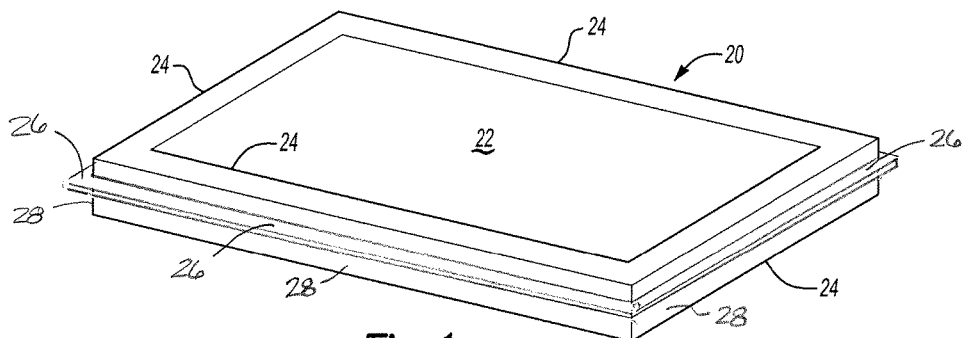
FIG. 1 diagrammatically illustrates a fuel cell component designed according to an embodiment of this invention.

FIG. 1 schematically shows a fuel cell component 20. In this example, the component 20 comprises a porous, graphitized substrate 22 with a polymer impregnated region 24. In the illustrated example, the polymer impregnated region 24 is situated around a periphery of the component 20. In embodiments that are configured for use in a phosphoric acid fuel cell assembly, the polymer impregnated into the region 24 is chemically resistant to phosphoric acid and provides a seal against phosphoric acid movement through or across the region 24. The seal provided by the impregnated region 24 is also useful for controlling outboard reactant leaks (e.g., in-plane movement out of the substrate). The impregnated region 24 in the illustrated example is a seal to prevents reactant leaks and phosphoric acid leaks. In some embodiments less than the entire periphery includes an impregnated region. For example, some components have a two-sided or three-sided seal. In such embodiments, at least the side or portion of the component that includes the region 24 is a sealed side or portion of the component.

The example component 20 may be used as an electrode in a phosphoric acid fuel cell. In some examples, the component 20 comprises a gas diffusion layer.

The example component 20 includes a flap 26 of the polymer material protruding from or extending beyond an edge 28 of the substrate 22. In this example a flap 26 is provided on each of the edges 28 around the periphery of the substrate 22. Other embodiments include a flap 26 on less than all of the edges 28 (e.g., a rectangular substrate 22 may have a flap 26 at two oppositely facing edges but no flap 26 on the other two edges). Other embodiments include more than one flap 26 on at least one of the edges 28.

The flap 26 provides a barrier for preventing fluid movement along an outer surface (i.e., the edge 28) of the substrate 22 when the component 20 is situated within a fuel cell assembly. For example, the flap 26 is configured to prevent phosphoric acid migration or movement along the outer edge of the cell stack assembly.

Figure 2A:
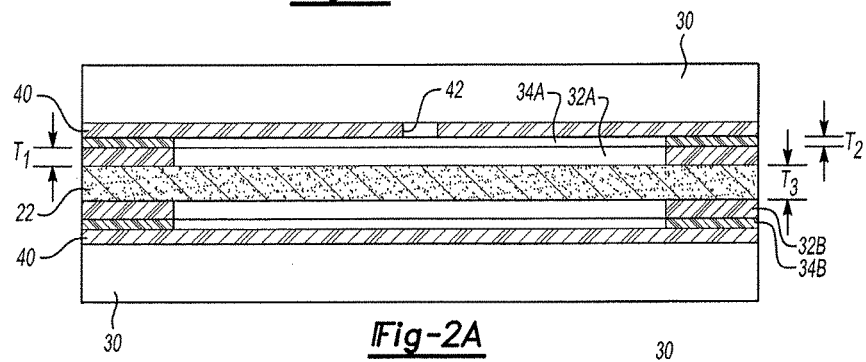
FIGS. 2A-2C schematically illustrate an arrangement and method for making a fuel cell component according to an embodiment of this invention.
Figure 2B:
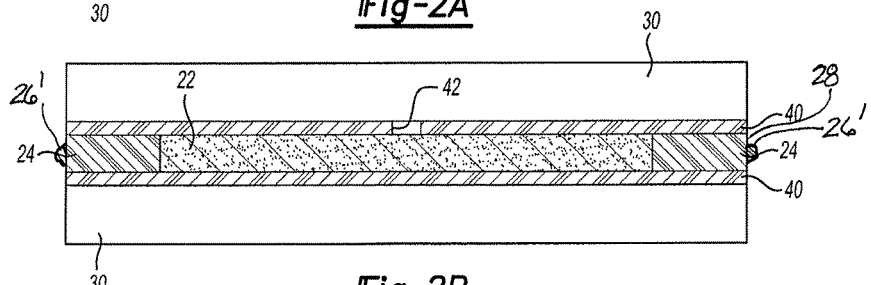
Figure 2C:
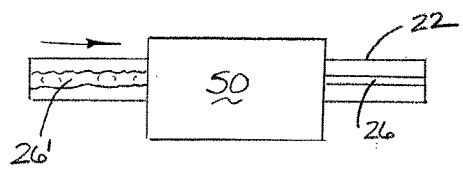

FIGS. 2A-2C schematically illustrate an arrangement and method for making a fuel cell component such as the component 20 shown in FIG. 1. In this example, a heated press includes plates 30, which may comprise graphite for example. The porous substrate 22 is situated between the plates 30 with at least one polymer film layer situated against the substrate 22. In the example of FIG. 2A, four separate polymer film layers are situated between the plates 30. Polymer film layers 32A and 32B are situated directly against the substrate 22 on opposite sides of the substrate 22. Additional polymer film layers 34A and 34B are included in this example. In some situations, a desired thickness of the polymer film layers may be achieved by using a single polymer film layer on each side of the substrate 22. Depending on commercially available film thicknesses, some examples include providing multiple polymer film layers to achieve a desired thickness.

In some embodiments, an exterior perimeter of the film layer 32A corresponds to the exterior of the substrate 22. An interior perimeter is situated to establish a surface area of the polymer film 32A. The total surface area of the polymer film 32A is less than the total surface area of the substrate 22. The interior perimeter may be selected to correspond to the outside border of the chemically active region of the substrate 22 so that the polymer impregnated into the substrate 22 does not hinder or interfere with the electrochemical reaction that is desired within a fuel cell incorporating the component 20.

Example materials useful as a polymer film are commercially available, such as PEEK™ and Teflon™ (e.g. PFA). The polymer material in the illustrated example is a high melt flow, thermally stable, non-wetting material that is chemically resistant to phosphoric acid. The high melt flow characteristics of the material correspond to a minimum of 0.25 g/10 mins per ASTM D2116. The example polymer material is thermally stable below 220° C.

In other examples, a polymer powder is used instead of a polymer film. Given the particular substrate characteristics of a particular fuel cell arrangement, those skilled in the art who have the benefit of this description will be able to select an appropriate polymer film, powder or other material composition to meet their particular needs.

As can be appreciated from FIG. 2A, the polymer film layers 32A and 32B have a first thickness $T_1$. The polymer film layers 34A and 34B have a second, smaller thickness $T_2$. The substrate 22 has a third thickness $T_3$. The desired total thickness of all the polymer films involved in the manufacturing process corresponds to a porosity of the substrate 22 multiplied by the thickness $T_3$ of the substrate 22. The minimum thickness of the polymer films (collectively if there are multiple layers) is approximately equal to the product of the porosity and the third thickness $T_3$. In some examples, the porosity of the substrate 22 is not entirely consistent across the entire substrate. One example embodiment includes using the maximum porosity of the substrate to determine the desired polymer film thickness. Using the maximum porosity assists in establishing an adequate seal in the region 24.

In the illustrated example, $T_1+T_2$ is approximately equal to one-half of the porosity of the substrate 22 multiplied by the thickness of the substrate 22. Providing the film layers 32 and 34 on each side of the substrate 22 yields a total thickness of the polymer films that correspond to the porosity of the substrate 22 multiplied by the thickness $T_3$ of the substrate 22.

One feature of the example of FIG. 2A is that a thicker polymer film layer is placed closer to the substrate 22 than another polymer film layer that is thinner. The layers 32A and 32B are thicker than the layers 34A and 34B and, therefore, the layers 32A and 32B are placed against the substrate 22. Situating thinner films further from the substrate 22 facilitates more uniform melting and distribution of the polymer used to impregnate the region 24 in some examples.

For purposes of facilitating an easy release of the impregnated substrate from between the plates 30, release films 40 are included between the most exterior polymer film layers and the plates 30. An example release film 40 includes at least one opening within the film to facilitate allowing gases to escape from between the release films 40 included in the example of FIGS. 2A and 2B. Allowing gases to escape in this way avoids any undesired variations or defects along the substrate 22 and, in particular, the polymer impregnated region 24.

During the manufacturing process, the substrate 22, polymer film layers 32 and 34 and release films 40 are compressed between the plates 30 as shown in FIG. 2A. A first pressure is applied to the layers between the plates 30 while the layers are heated up until at least the polymer film layers 32 and 34 reach a melting temperature of the polymer. In one example, the first pressure is less than 100 psi. After the melting temperature has been reached at a coldest portion of the polymer film layers, the pressure is increased while temperature increases to a second temperature that exceeds the melting temperature of the polymer. In one example, 100 psi pressure is used while increasing the temperature of at least the polymer material until that temperature is approximately 20° C. higher than the melting temperature of the polymer. A ten percent tolerance is acceptable in some examples (e.g., the temperature reached while applying the second, higher pressure may be between 18° and 22° above the melting temperature of the polymer). In some examples, the higher pressure and higher temperature is applied for a time on the order of one minute. Those skilled in the art that have the benefit of this disclosure will be able to choose an appropriate temperature and time to meet their particular needs for their selected polymer and component configuration.

The second pressure and increased pressure causes the plates 30 to move closer together as shown in FIG. 2B. As a result of the high temperature and the pressure applied, the polymer material of the polymer films melts and impregnates the region 24 along the portions of the substrate 22 where the polymer films were applied including the edges 28.

As can be appreciated from FIG. 2B, some of the polymer has moved through the substrate 22 passed the edges 28 so that there is some polymer material shown at 26' extending beyond each edge 28. The polymer shown at 26' may have a desired geometry as a result of some molding processes. In the illustrated example, the polymer material at 26' does not have a shape or profile corresponding to a desired geometry of the flap 26. FIG. 2C schematically shows a machining device 50 that machines away (e.g., trims off) some of the polymer material 26' to establish a selected geometry of the flaps 26.

Figure 3:
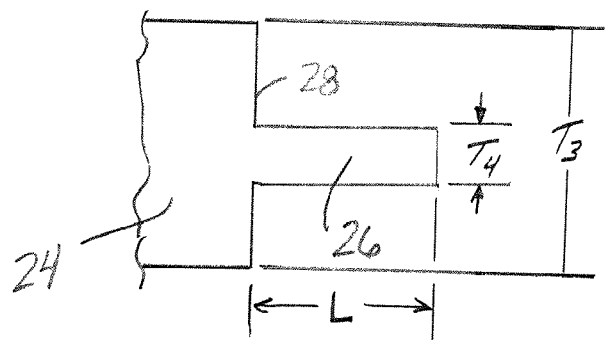
FIG. 3 illustrates features of an example flap configuration.

FIG. 3 shows one example flap geometry. In this example, the flap 26 has a flap length L extending in a direction away from the edge 28 and a flap thickness $T_4$ extending in a direction transverse to the direction of the length. The flap thickness $T_4$ is less than the thickness $T_3$ of the substrate 22 in the illustrated embodiment. The flap thickness $T_4$ may be as large as the substrate thickness $T_3$ in some examples.

The length L is at least twice the flap thickness $T_4$ in some embodiments. In one example, the length L is approximately 10 mil and the thickness $T_4$ is approximately 5 mil. Such a flap configuration provides a 25 mil distance that a fluid, such as phosphoric acid, must travel if the fluid were moving in an undesired manner along the edge 28 of the substrate 22. This distance and the hydrophobic barrier nature of the polymer are sufficient to prevent undesired fluid movement along the edge 28, which facilitates better fluid management and control within a fuel cell assembly.

The flap geometry in this example includes a generally rectangular cross-section. Other profiles or cross-sections, such as semi-circular, triangular or another polygon, may be useful for some situations.

Figure 4:
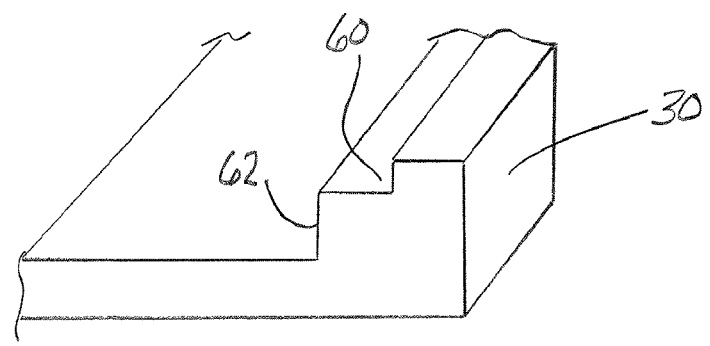
FIG. 4 illustrates another example arrangement for making a fuel cell component according to an embodiment of this invention.

FIG. 4 illustrates an alternative configuration of at least one of the plates 30. In this example, the plate 30 includes a channel 60 situated near a shoulder 62 against which the edge 28 of the substrate 22 is received. When the polymer melts and impregnates the substrate 22 some of the polymer flows into the channel 60. The configuration of the channel 60 establishes the selected geometry or shape of the flap 26. With such a plate 30 it may be possible to avoid machining away or trimming off excess polymer material.

Manufacturing a fuel cell component utilizing the principles of this description may provide significant cost savings associated with the otherwise labor-intensive approach to providing a fluid barrier within a fuel cell assembly. For example, the flap 26 is integrated into the component 20, such as an electrode, instead of having to be provided as a separate component. This reduces labor and expenses associated with assembly a cell stack assembly.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

We claim:

1. A method of making a fuel cell component, comprising the steps of:
   permeating at least a portion of a component layer with a polymer by
   applying a first pressure to the polymer and component layer while heating the polymer until a temperature of at least the polymer reaches a melting temperature of the polymer; and
   applying a second, greater pressure to the polymer and component layer while increasing a temperature of at least the polymer to a second temperature above the melting temperature of the polymer, wherein the portion is adjacent an edge of the component layer; and
   allowing some of the polymer to extend beyond the edge to thereby establish a flap beyond the edge of the component layer.

2. The method of claim 1, comprising
   shaping the polymer extending beyond the edge into a selected flap geometry.

3. The method of claim 2, wherein the shaping comprises machining the polymer extending beyond the edge to selectively remove at least some of the polymer.

4. The method of claim 2, wherein the shaping comprises
   providing a mold cavity near the edge of the component layer; and
   allowing the polymer extending beyond the edge to fill the cavity during a molding process.

5. The method of claim 2, wherein
   the component layer has a first thickness;
   the selected flap geometry includes a flap length extending in a direction away from the edge and a second, flap thickness in a direction transverse to the length.

6. The method of claim 5, wherein the second thickness is smaller than the first thickness.

7. The method of claim 2, wherein the selected flap geometry includes a generally rectangular cross section.

8. The method of claim 1, wherein the polymer is chemically resistant to phosphoric acid.

9. A fuel cell component, comprising a component layer having a portion adjacent an edge of the layer that is impregnated with a polymer material and a flap of the polymer material extending beyond the edge
   wherein
   the fuel cell component is made by a process comprising
   applying a first pressure to the polymer and component layer while heating the polymer until a temperature of at least the polymer reaches a melting temperature of the polymer; and
   applying a second, greater pressure to the polymer and component layer while increasing a temperature of at least the polymer to a second temperature above the melting temperature of the polymer; and
   allowing some of the polymer to extend beyond the edge to thereby establish the flap.

10. The fuel cell component of claim 9, wherein the component layer has a first thickness and the flap has a second thickness.

11. The fuel cell component of claim 10, wherein the second thickness is smaller than the first thickness.

12. The fuel cell component of claim 9, wherein the polymer material comprises a high melt flow polymer that is non-wetting and thermally stable below a temperature of approximately 220° C.

13. The fuel cell component of claim 11, wherein the component layer comprises a porous graphitized substrate.

14. The fuel cell component of claim 11, wherein the component comprises at least one of an electrode or a gas diffusion layer.

15. The fuel cell component of claim 9, wherein the polymer is chemically resistant to phosphoric acid.

16. The fuel cell component of claim 9, wherein the flap has a selected geometry including a flap length extending in a direction away from the edge and a flap thickness in a direction transverse to the flap length.

17. The fuel cell component of claim 16, wherein the flap length is at least about twice the flap thickness.

18. The fuel cell component of claim 16, wherein the selected flap geometry includes a generally rectangular cross section.

* * * * *